April 25, 1944.   F. O. LEWIS   2,347,492
MEANS FOR AND METHOD OF REMOVING COMBUSTION BY-PRODUCTS
FROM INTERNAL COMBUSTION ENGINES
Filed Aug. 2, 1941
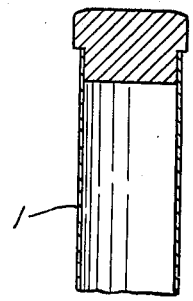
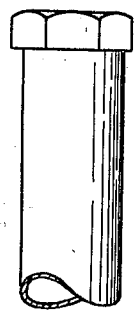
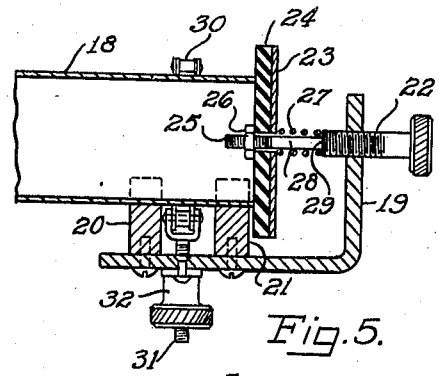
Fig.3.   Fig.2.
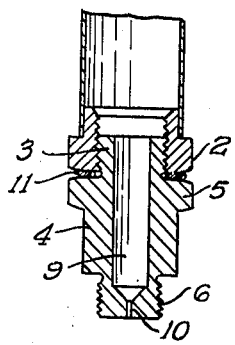
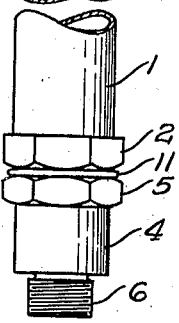
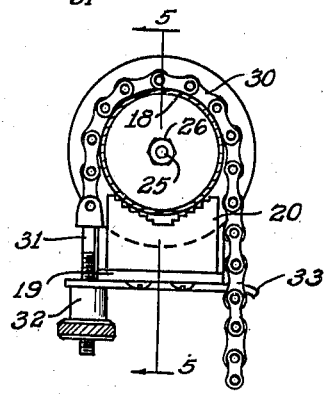
Fig.4.
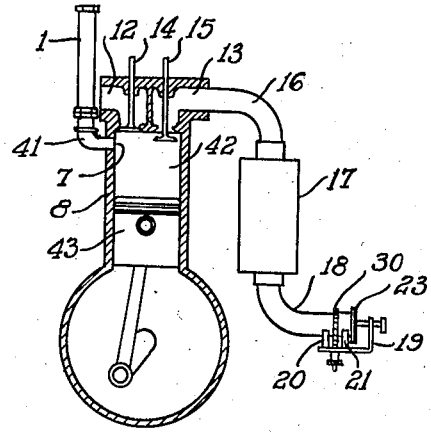
Fig.1.
INVENTOR.
FRED O. LEWIS
BY
ATTORNEYS.

Patented Apr. 25, 1944

2,347,492

UNITED STATES PATENT OFFICE 2,347,492

MEANS FOR AND METHOD OF REMOVING COMBUSTION BY-PRODUCTS FROM INTERNAL COMBUSTION ENGINES

Fred O. Lewis, Dayton, Ohio

Application August 2, 1941, Serial No. 405,260

5 Claims. (Cl. 123—198)

This invention relates to novel means and method for removing the by-products of combustion such as gum, road dirt, and carbon which accumulate in the cylinders and particularly in the combustion chamber and about the piston and valve stems of internal combustion engines.

It is the principal object of the invention to more efficiently and economically accomplish the objective of dissolving the gummy by-products of combustion which cause the road dirt, carbon and other such products of combustion to accumulate in and adhere to internal parts of the engine, without necessity for disassembly of the engine.

More particularly it is the object of the present invention to provide means for and method of injecting solvent into the cylinder of an internal combustion engine in such a manner as to vaporize the solvent at a high pressure so as to insure its reaching and thoroughly saturating all parts where the aforesaid gummy by-product of combustion has accumulated in order to dissolve the same and facilitate removal of all accumulated combustion by-products.

It is a further object of the invention to introduce the solvent in the form of a vapor under pressure into the cylinders automatically by utilization of the normal operation of the pistons therein to create the pressure for this purpose.

Another object of the invention is to introduce solvent to the cylinder of an engine in the desired manner without the necessity for first rendering the exhaust and intake valves inoperative.

A further object of the invention is to provide relief valve means at the exhaust manifold whereby to create a back pressure therein during injection of the solvent into the cylinders which will assist in forcing the vaporized solvent to all parts of the cylinders where the gummy by-product of combustion accumulates and inhibit the exhaustion of the vaporized solvent from the cylinders.

Heretofore the removal of the by-products of combustion from internal combustion engines without disassembly of the engine has involved difficulties in respect to the inability to introduce the solvent to the cylinder automatically under sufficient pressure to vaporize the same without first making the valves inoperative. Another difficulty heretofore has been the inability to introduce the solvent in the form of vapor automatically into the cylinder in such a manner as to enable it to be forced up around the valve stems. Another difficulty heretofore has involved the fact that introduction of solvent to the cylinders under pressure without first rendering the valves inoperative resulted in rapid exhaustion and consequent waste of the solvent through the exhaust manifold.

The present invention overcomes the foregoing difficulties and accomplishes the removal of the by-products of combustion from their places of accumulation in internal combustion engines by the introduction of a solvent, preferably a gum removing solvent, into the cylinders under high pressure in the form of vapor, automatically, by the operation of the engine pistons without necessity for disassembly of the engine or for rendering the valves inoperative and in such a manner as to force the solvent to all parts of the cylinder as well as around the valve stems, provision being made for inhibiting exhaust of the solvent vapor from the cylinder. The lack of necessity for disassembly of the engine or for rendering the valves inoperative results in a considerable saving of time and labor in connection with engine maintenance. By inhibiting passage of the solvent vapor out through the exhaust system said vapor is caused to be retained within the cylinder for a greater length of time thus enabling thorough saturation and consequent dissolution of the gummy by-products of combustion, resulting in more efficient and economical use of the relatively expensive solvent employed for this purpose.

In carrying the invention into practice I provide a solvent injector comprising a closed container for solvent having a restricted orifice or jet at one end which is adapted to be placed into communication with the cylinder by removing the spark plug therefrom and screwing the orifice or jet end of the solvent container into the spark splug receiving opening of the cylinder. I preferably provide such a solvent injector for each of the cylinders of the internal combustion engine. I further provide relief valve means which is readily attachable to the tail pipe of the engine exhaust manifold to close the latter. This relief valve means is adjustable to enable the valve to open at a selected predetermined pressure created within the exhaust manifold during the solvent injection operation.

With the solvent injectors connected to the respective cylinders and the relief valve means associated with the exhaust manifold as described, the engine may then be driven by the starter motor or other means without ignition and a pressure will be built up in the respective solvent injectors upon the compression strokes of the pistons which will cause the solvent to be discharged into the cylinders in the form preferably of a saturated vapor during the power, exhaust and intake strokes of the engine pistons. By the closing of the exhaust manifold in the manner indicated a back pressure is built up therein which not only inhibits escape of solvent vapor therefrom but causes the solvent vapor to be forced to all parts of the engine cylinders and around the intake and exhaust valve stems.

Other objects, advantages and features of novelty will appear more fully as the description of the invention progresses in conjunction with the accompanying drawing in which:

Figure 1 is a sectional view through an internal combustion engine cylinder showing the solvent injector and the relief valve means of my invention associated respectively with said cylinder and with the tail pipe of the exhaust manifold.

Figure 2 is a view showing the solvent injector alone.

Figure 3 is a sectional view of the same.

Figure 4 is a view showing in more detail the attachment of the relief valve means to the exhaust manifold tail pipe.

Figure 5 is a sectional view on the line 5—5 of Figure 4.

Now describing the invention in detail and referring to the accompanying drawing in which like reference characters indicate like parts in the several figures, the solvent injector comprises the tubular container 1 provided at the lower end with the polygonally headed bushing 2 which may be formed integrally with or otherwise firmly secured to said tubular container 1. The bushing 2 is internally threaded to receive the externally threaded portion 3 of an adapter plug 4 which is provided with a polygonal head 5 similar to the head of the bushing 2 so as to enable engagement by the same wrench. The adapter plug 3 is provided with an externally threaded portion 6 adapted to be screwed into the spark plug receiving opening 7 of the cylinder 8 of an internal combustion engine, if, in so doing, the injector container 1 will assume a position inclined above horizontal. Where the spark plug opening is horizontal, as in the cylinder illustrated in Figure 1, an elbow adapter 41 will be inserted in the spark plug opening 7 and the injector 1 screwed into said elbow adapter 41, as shown in Figure 1.

The adapter plug 4 is provided with a passage 9 which is of very small diameter at its lower end to provide a restricted orifice or jet 10. The engine cylinder 8 is provided with the usual intake and exhaust ports 12 and 13 respectively; intake and exhaust valves 14 and 15 respectively; and piston 43. Exhaust port 13 is connected by a pipe 16 to the exhaust manifold 17 provided with a tail pipe 18.

Relief valve means is attachable to the outer end of the tail pipe 18. As shown, said relief valve means comprises an angle bracket 19 provided with serrated jaws 20 and 21 for engagement with the tail pipe as seen best in Figures 4 and 5. An adjusting bolt 22 extends through the upstanding or vertical portion of the bracket 19 and has threaded engagement therewith. Loosely mounted on bolt 22 is a disk 23 one face of which is provided with a cushion 24 of suitable resilient material such as rubber or the like and suitably secured to said disk. The threaded end 25 of the bolt 22 receives a nut 26 for holding the disk 23, 24 on the bolt against the action of a compression spring 27 surrounding the reduced shank 28 of the bolt 22 and engaged with the disk 23 and with a shoulder 29 of the bolt 22.

For securing the relief valve means to the tail pipe 18 there is provided means 30 which, as shown, comprises a chain one end of which is provided with a threaded stem 31 adapted for threaded engagement with a suitable opening in the bracket 19. Nut 32 is provided on the end of threaded stem 31 and engages the lower side of the bracket 19. The bracket 19 is provided on one side with a laterally extending prong 33 for engagement between any two of the links of the chain 30. The chain 30 is adapted to encircle the end of the tail pipe 18 and to be engaged with the prong 33 of the bracket 19 whereupon tightening of the nut 32 on the stem 31 will cause the jaws 20 and 21 to be tightly clamped to the tail pipe to retain the bracket 19 thereon. With the bracket 19 attached to the tail pipe 18 as described the adjusting bolt 22 may be rotated to engage the disk 23, 24 against the outer end of the tail pipe 18 to close the opening in the outer end of said tail pipe.

In the use of my invention in connection with multi-cylinder engines it is contemplated that solvent injectors such as shown in Figures 2 and 3 shall be provided for each of the cylinders of such engines. A suitable solvent, preferably a gum dissolving solvent, is placed in the containers 1 of said solvent injectors. One example of a solvent suitable for the purpose is one composed of coluol, ethyl acetate and ethyl alcohol. Said containers 1 however are not completely filled with the solvent but in the filling, space is left in said containers for the purpose of permitting the entrance thereinto of air or gas forced into said containers as a result of the operation of the engine pistons as more fully described hereinafter. Conveniently, the containers 1 may be filled with solvent by removal of the adapter plug 4 and filling the container 1 almost to the top so that when the adapter plug is replaced in the container 1 and the injector connected in communication with the engine cylinder 8, a space unfilled with solvent will be left within the container 1 approximately equal to the cubic area of the passage 9.

In the use of my invention the tension of the spring 27 holding the valve disk 23, 24 against the outlet opening of the tail pipe 18 to close the same, will be regulated by adjustment of the adjusting screw 22 so that said valve disk 23, 24 will be caused to open against the action of the spring 27 when the back pressure built up in the exhaust manifold during the solvent injection operation would otherwise be sufficient to prevent operation of the pistons and thereby stall the starter motor or other means of causing the operation of the engine pistons during such time.

With the solvent containers filled as above described and in communication with the respective cylinders of the engine being operated upon, and with the relief valve means 23, 24 adjusted as described, the operation is believed to be substantially as follows:

Assuming that the engine piston or pistons 43 are being operated by the starter motor or other means, a pressure of gas or air is built up in the container 1 of the solvent injector or injectors during the compression strokes of the piston 43, the intake and exhaust valves 14 and 15 at such time being closed. Under such condition, namely during the compression up-stroke of the piston 43, air or gas in the compression chamber 42 of the cylinder 8 is forced into the container 1 of the solvent injector through the orifice or jet 10 thereof so as to build up a pressure in the container 1 of the solvent injector. During the subsequent power down-stroke, exhaust up-stroke and intake down-stroke of the piston 43, the pressure previously built up in the container 1 of the solvent injector will cause the solvent therein to be discharged into the cylinder 8. Because of the restricted orifice or jet 10 and the pressure with which the solvent is discharged from the container 1, the solvent so discharged will be introduced into the cylinder 8 in the form of a fine mist or vapor.

Because of the fact that the exhaust tail pipe 18 is closed by the valve 23, 24 a pressure will be built up in the exhaust system 16, 17, 18 during the exhaust up stroke of the piston 43, at which time the exhaust valve 15 is open.

The discharge of solvent from the injector 1 into the engine cylinder 8 under high pressure and in the form of vapor causes the solvent vapor to be disseminated over the entire interior of the cylinder 8 and to force the same up around the stems of the intake and exhaust valves 14 and 15 during such times as those valves are open. The back pressure built up in the exhaust system 16, 17, 18 assists in this desirable result of dissemination of the solvent vapor to all parts of the cylinder 8 and forcing of the same up around the stems of the valves 14 and 15.

By the provision of the relief valve means 23, 24 the back pressure built up in the exhaust system 16, 17, 18 inhibits the escape of solvent vapor through the exhaust system and causes said vapor to be retained longer in the combustion chamber and around the valve stems thus assuring more thorough saturation of the parts desired to be treated therewith and resulting in more economical and efficient use of the relatively expensive solvent employed for this purpose.

Whenever the back pressure in the exhaust system 16, 17, 18 is built up to such a point as to retard operation of the piston 43 in the cylinder 8 and thereby tend to stall the starter motor or other means of starting, the pressure in the exhaust system will be relieved by outward movement of the valve 23, 24 against the action of the spring 27. As above indicated, the tension on the spring 27 will be so regulated by means of the adjusting screw 22 as to permit the relief action of the valve 23, 24 to prevent retarding of the operation of the piston 43 with consequent stalling of the starter motor.

It is important to note that the solvent injector is entirely closed from communication with the atmosphere except as the interior of the container 1 may at times and for very short intervals have indirect communication with the atmosphere through the intake or exhaust ports 12 or 13, the cylinder 8 and the orifice or jet 10; that the orifice or jet 10 is preferably of such small size as to cause substantial vaporization of liquid solvent discharged under pressure from said container 1 through said orifice 10; and that introduction of solvent from said container 1 into the cylinder 8 results from operation of the piston 43 within said cylinder. As exemplary of the small size of the jet or orifice 10 preferred, I have found in actual practice that an orifice of around 74 drill size (.0225 inch) is quite suitable. The size depends to some extent upon the viscosity of the solvent and the desired rapidity of discharge. The jet must be sufficiently large so that it will not readily become clogged in use. I do not, of course, desire to be limited in any way to the exact size of the orifice 10, the primary requirement being merely that it preferably be sufficiently small to enable vaporization of liquid solvent discharged therethrough at higher pressures.

The introduction of solvent into the cylinder of an internal combustion engine by the means and according to the method of the present invention causes the solvent, which is preferably introduced in the form of a mist or saturated vapor, to be forced around the piston rings and back of the same to dissolve the gummy by-product of combustion which accumulates thereon. In the use of internal combustion engines the combustion by-products accumulate between the piston and the ring and in the oil drain holes of the oil control rings. Heretofore it has been practically impossible to effectively remove the accumulation of combustion by-products at the places just mentioned by the introduction of solvent into the combustion chamber of the cylinder. The accumulation of combustion by-products at these places materially reduces the efficiency of the engine, and particularly the accumulation on the oil control rings tends to render the latter inoperative for their purpose.

The removal of combustion by-products accumulating around the piston rings is effectively dealt with by the use of my invention.

Having thus described my invention, what I claim as new and desire to secure by Letters Patent of the United States is:

1. Means for removing combustion by-products from internal combustion engine cylinders comprising the combination with a cylinder, and a piston operable therein, said cylinder having an exhaust port therein, a valve for said port operable upon movement of said piston, and an exhaust conduit normally communicating from said exhaust port to the atmosphere, of a closed solvent container, means of communication only between the interior of said container and the interior of said cylinder, and means normally closing the exhaust conduit, said piston being operable to cause discharge of said solvent from said container into the same cylinder and to cause a back pressure to be built up in said exhaust conduit, said last means comprising relief valve means.

2. Means for removing combustion by-products from internal combustion engine cylinders comprising the combination with a cylinder and a piston operable therein, said cylinder having a spark plug receiving opening therein, an exhaust port, a valve for said port operable upon movement of said piston, and an exhaust conduit communicating from said exhaust port to the atmosphere, of a closed solvent container, means receivable in the spark plug opening for providing communication between the interior of the container and the interior of said cylinder, said means of communication including an orifice of such diameter as to enable vaporization of liquid solvent discharged under pressure therethrough, and relief valve means attachable to said conduit and including a valve member, and adjustable spring means normally urging said valve member into engagement with said conduit to close the same and yieldable to permit opening movement of said valve member upon a pre-determined pressure within said conduit.

3. Means for removing combustion by-products from internal combustion engine cylinders comprising the combination with a cylinder, and a piston operable therein, said cylinder having an exhaust port therein, a valve for said port operable upon movement of said piston, and an exhaust conduit normally communicating from said exhaust port to the atmosphere, of a closed solvent container, means of communication only between the interior of said container and the interior of said cylinder, and means normally closing the exhaust conduit, said piston being operable to cause discharge of said solvent from said container into the same cylinder and to cause a back pressure to be built up in said exhaust conduit, said last means is attachable to said conduit and includes a valve member, and adjustable spring means normally urging said valve member into engagement with said conduit to close the same and yieldable to permit opening movement of said valve member upon pre-determined pressure within said conduit.

4. Means for removing combustion by-products from internal combustion engine cylinders comprising the combination with a cylinder and a piston operable therein, said cylinder having an exhaust port therein, a valve for said port operable upon movement of said piston, and an exhaust conduit communicating from said exhaust port to the atmosphere, of a closed solvent container, means of communication between the interior of the container and the interior of said cylinder and relief valve means attachable to said conduit and including a valve member, and adjustable spring means normally urging said valve member into engagement with said conduit to close the same and yieldable to permit opening movement of said valve member upon a predetermined pressure within said conduit.

5. Means for removing combustion by-products from internal combustion engine cylinders comprising the combination with a cylinder and a piston operable therein, said cylinder having an exhaust port therein, a valve for said port operable upon movement of said piston, and an exhaust conduit normally communicating from said exhaust port to the atmosphere, of a closed solvent container, means of communication between the interior of the container and the interior of said cylinder and relief valve means attachable to said conduit and including a valve member, and adjustable spring means normally urging said valve member into engagement with said conduit to close the same and yieldable to permit opening movement of said valve member upon a predetermined pressure within said conduit, said piston being operable to force air or gas from said cylinder into said container to place the solvent therein under pressure of said air or gas and to cause discharge of said solvent from said container into the same cylinder under pressure of said air or gas and to cause a back pressure to be built up in said exhaust conduit.

FRED O. LEWIS.